United States Patent
Gujar et al.

(10) Patent No.: US 10,210,468 B2
(45) Date of Patent: Feb. 19, 2019

(54) METHODS AND SYSTEMS FOR REGULATING SERVICE LAYER AGREEMENTS FOR MULTIPLE CLOUD SERVICE REQUESTS

(71) Applicant: Xerox Corporation, Norwalk, CT (US)

(72) Inventors: Sujit Gujar, Bangalore (IN); Tridib Mukherjee, Bangalore (IN); Koustuv Dasgupta, Bangalore (IN); Gueyoung Jung, Rochester, NY (US)

(73) Assignee: XEROX Corporation, Norwalk, CT (US)

( * ) Notice: Subject to any disclaimer, the term of this patent is extended or adjusted under 35 U.S.C. 154(b) by 431 days.

(21) Appl. No.: 15/046,834

(22) Filed: Feb. 18, 2016

(65) Prior Publication Data

US 2016/0162823 A1 Jun. 9, 2016

Related U.S. Application Data

(63) Continuation of application No. 13/741,408, filed on Jan. 15, 2013.

(51) Int. Cl.
*G06Q 10/06* (2012.01)
*G06Q 30/02* (2012.01)
(Continued)

(52) U.S. Cl.
CPC ... *G06Q 10/06315* (2013.01); *G06Q 30/0282* (2013.01); *G06Q 30/0631* (2013.01); *H04L 67/02* (2013.01); *H04L 67/322* (2013.01)

(58) Field of Classification Search
CPC ......... G06Q 10/06315; G06Q 30/0282; G06Q 30/0631; H04L 67/02; H04L 67/322
See application file for complete search history.

(56) References Cited

U.S. PATENT DOCUMENTS 8,676,981 B2 *  3/2014  Hackett ................. G06Q 10/06
                                                    709/226
2008/0270313 A1  10/2008  Cullen et al.
(Continued)

OTHER PUBLICATIONS

Segal, Illya, "Optimal Pricing Mechanisms with Unknown Demand", Aug. 15, 2002.

*Primary Examiner* — Sujay Koneru
(74) *Attorney, Agent, or Firm* — Jones Robb, PLLC

(57) ABSTRACT

Methods and systems are disclosed for providing cloud services to multiple customers in a cloud. One embodiment includes receiving a number of requests for the cloud services from the multiple customers simultaneously or substantially simultaneously; prioritizing the requests based on a probability distribution of actually deploying a service, a budget of the customers, and an expected demand of the requested service based on the probability distribution; generating a number of cloud configurations along with a number of Service Level Agreements (SLAs) for the customers based on prioritization of the requests, a class & past behavior of the customers, and a current demand of the cloud services, the SLAs of the customers include differentiated price offering; recommending the cloud configurations and the SLAs to the customers; allowing the customers to negotiate terms of the SLAs; and providing the cloud services based on the negotiated SLAs to the customers.

20 Claims, 10 Drawing Sheets

(51) Int. Cl.
*G06Q 30/06* (2012.01)
*H04L 29/08* (2006.01)

(56) References Cited

U.S. PATENT DOCUMENTS

| | | |
|---|---|---|
| 2010/0280861 A1 | 11/2010 | Rossen et al. |
| 2011/0161696 A1* | 6/2011 | Fletcher ............... G06F 1/3203 713/320 |
| 2011/0173108 A1 | 7/2011 | Rajasekar et al. |
| 2011/0213712 A1 | 9/2011 | Hadar et al. |
| 2011/0231525 A1 | 9/2011 | Balani et al. |
| 2011/0238460 A1 | 9/2011 | Al-Dawsari et al. |
| 2011/0295986 A1 | 12/2011 | Ferris et al. |
| 2012/0023501 A1 | 1/2012 | Chi et al. |
| 2012/0123886 A1 | 5/2012 | Brown et al. |
| 2012/0144040 A1 | 6/2012 | Hacigumus et al. |
| 2012/0239739 A1* | 9/2012 | Manglik ............... G06F 9/5077 709/203 |
| 2012/0331113 A1 | 12/2012 | Jain et al. |
| 2013/0066477 A1* | 3/2013 | Jiang ..................... G01D 4/002 700/291 |
| 2013/0132561 A1 | 5/2013 | Pasala et al. |
| 2014/0047099 A1 | 2/2014 | Flores et al. |

* cited by examiner

METHODS AND SYSTEMS FOR REGULATING SERVICE LAYER AGREEMENTS FOR MULTIPLE CLOUD SERVICE REQUESTS

This patent application is a continuation of U.S. patent application Ser. No. 13/741,408, filed on Jan. 15, 2013, entitled METHODS AND SYSTEMS FOR REGULATING SERVICE LAYER AGREEMENTS FOR MULTIPLE CLOUD SERVICE REQUESTS.

TECHNICAL FIELD

The presently disclosed embodiments relate to networks, and more particularly, to methods and systems for providing cloud services.

BACKGROUND

With the advent of computing clouds, there has been a surge in cloud-based services. Cloud-based services provide service users with on-demand access to virtualized resources for service execution, including networks, servers, applications, data storage, and services running on a platform. In recent years, there has been a significant increase in the scale of services hosted over the cloud. In addition, given the wide gamut of service users ranging from business users, e.g., business analysts, to small and medium business (SMB) customers, make it advantageous, and in some cases, imperative to present the services in the marketplace in an easy-to-use manner. Unfortunately, conventional methodologies for presenting cloud services require specific cloud configuration details from users, e.g., SW platform requirements, number of processors, the type and number of virtual machines (VMs), amount of storage, and so forth.

Conventional interfaces or virtualization engines, e.g., Amazon EC2, Rackspace, Microsoft Azure, ACS AMP 3.0, IBM TSAM, Sun Virtualbox, and so forth, present cloud-based services as infrastructure solutions where users need to provide detailed cloud configuration inputs. Usually, in the SMB marketplace where it may be advantageous for many cloud vendors, such as Xerox and ACS Cloud, to extend their cloud services business, detailed cloud configuration information may be unknown to the users, especially to non-IT experts. Hence, users may erroneously request inefficient configurations of services, either overprovisioning or under-provisioning their services. In at least some cases of overprovisioning, more resources are configured than are actually needed, which may lead to resource overuse, causing the energy usage and budget for the service to be higher than necessary. On the other hand, at least some cases of under-provisioning, fewer resources may be requested than required to maintain the desired performance demands resulting in a failure to satisfy such demands.

It may therefore be advantageous to provide enhanced methods or systems for recommending and regulating cloud configuration and Service Level Agreement (SLA) of applications requested by multiple customers in the cloud service marketplace.

SUMMARY

The presently disclosed embodiments provide methods and systems for providing one or more cloud services to a number of customers in a computing cloud. The presently disclosed embodiments provide a regulated recommendation system whereby a differentiated pricing based game-theoretic approach can be used to set different pricing ranges for different services depending upon customer type as well as an expected demand for resources. Embodiments of the disclosed methods can include receiving a number of requests for the one or more cloud services from customers simultaneously, substantially simultaneously or generally at the same or related times. The customers can be categorized into one or more classes, such as, but not limited to, a gold class, a silver class, a bronze class. The method can further include prioritizing the requests based on at least one of a probability distribution of actually deploying a requested service, a budget of each of the customers, and an expected demand of the requested service based on the probability distribution. The method can also include generating a number of cloud configurations along with a number of Service Level Agreements (SLAs) for each of the customers based on at least one of the prioritization of the requests, a class of each of the customers, past behavior of each of the customers, and a current demand of the cloud services in the computing cloud. The SLAs of the customers can include differentiated price offering. In some embodiments, the method can include recommending the generated cloud configurations and the SLAs to each of the customers. Further, price offering in each of the SLAs can be provided as a range including an upper limit and a lower limit for deploying one or more cloud services. In some embodiments, the method also includes allowing each of the customers to negotiate terms of its associated SLA and providing one or more cloud services based on the negotiated SLAs to the customers. The SLA for each of the customers is generated, such that revenue of a service provider is enhanced, increased or maximized, while enhancing, improving or ensuring customer satisfaction and/or quality-of-recommendation.

Another embodiment of the present disclosure provides a system for providing one or more cloud services to a plurality of customers in a computing cloud. The system can include a service level agreement regulation (SLA) system at a service layer of the computing cloud. The SLA regulation system can include a request processor configured to receive a number of requests for requesting the one or more cloud services from the multiple customers simultaneously, substantially simultaneously or generally at the same or related times. The customers can be categorized into one or more classes. The request processor can be further configured to process the requests based on at least one of a probability distribution of actually deploying a requested service, a budget of each of the customers, and an expected demand of the requested service based on the probability distribution. The SLA regulation system can also include a cloud configuration generator configured to generate a number of cloud configurations along with a number of service level agreements (SLAs) for each of the customers based on at least one of the prioritization of the requests, a class of each customer, past behavior of each of the customers, and a current demand of the cloud services in the computing cloud. In some embodiments, the SLAs of the customers include differentiated price offering. This SLA regulation system can further include a recommender system configured to recommend the generated cloud configurations and the SLAs through a number of output interfaces. The price offering in the SLAs can be provided as a range including an upper limit and a lower limit for deploying the one or more cloud services. The system can further include an SLA negotiator configured to allow each of the customers to negotiate terms of its associated SLA. The computing cloud provides the one or more cloud services based on the negotiated SLAs to the customers. The SLA for each of the customers is generated, such that revenue of a service provider is enhanced, increased or maximized, while enhancing, improving or ensuring customer satisfaction and/or quality-of-recommendation.

DETAILED DESCRIPTION

The following detailed description is made with reference to the figures. Exemplary, and in some cases preferred embodiments are described to illustrate the disclosure, not to limit its scope, which is defined by the claims. Those of ordinary skill in the art will recognize a number of equivalent variations in the description that follows.

Definitions

In various embodiments, definitions of one or more terms that will be used in the document are described below. The term 'energy rating' can define the relative energy consumption by a cloud-based service with respect to all other services in a cloud. The term 'green operation' can indicate the effect of the carbon footprint on the environment. The energy rating can, therefore be inversely related to the green operation, e.g., the lower the energy consumption, the greener the operation. Quality of Service (QoS) can include various factors, including, but not limited to, response time and throughput for delivering the cloud services successfully. Service Level Agreement (SLA) can refers to a contract with QoS guarantees as required by the cloud customer.

Overview

The present disclosure describes methods and systems for providing one or more cloud services to a number of customers in a cloud. The present disclosure introduces a regulated recommendation system, where a differentiated pricing based game-theoretic approach may be used to set different pricing range to different services, which are potentially contending for same set of available resources, depending on customer types, behavior, and expected demand of resources. The differentiated pricing may prioritize the service requests and then accordingly search for best configuration. The recommendation system may use the inherent probabilistic prioritization incurred by the pricing mechanism to plan for resources accordingly.

Overall Exemplary Cloud Architecture

Energy consumption to run cloud-based services is derived mainly from the underlying infrastructure, but there are different components contributing to the energy demand of the overall cloud. As discussed above, those components can be categorized as contributing to platform-specific energy demand and/or service-specific energy demand. Unlike the infrastructure-specific demand and the platform-specific demand, the service-specific energy demand, however, can be relaxed by allowing negotiations of SLAs on Quality of Service (QoS) parameters. Thus, service-specific energy reduction can provide higher flexibility by enabling a reduction in performance (i.e., by relaxing the QoS parameters) and hence providing greater opportunity for energy savings. The present disclosure intends to address the gap by focusing on the service layer and thereby providing an enhanced SLA regulation system.

Figure 1:
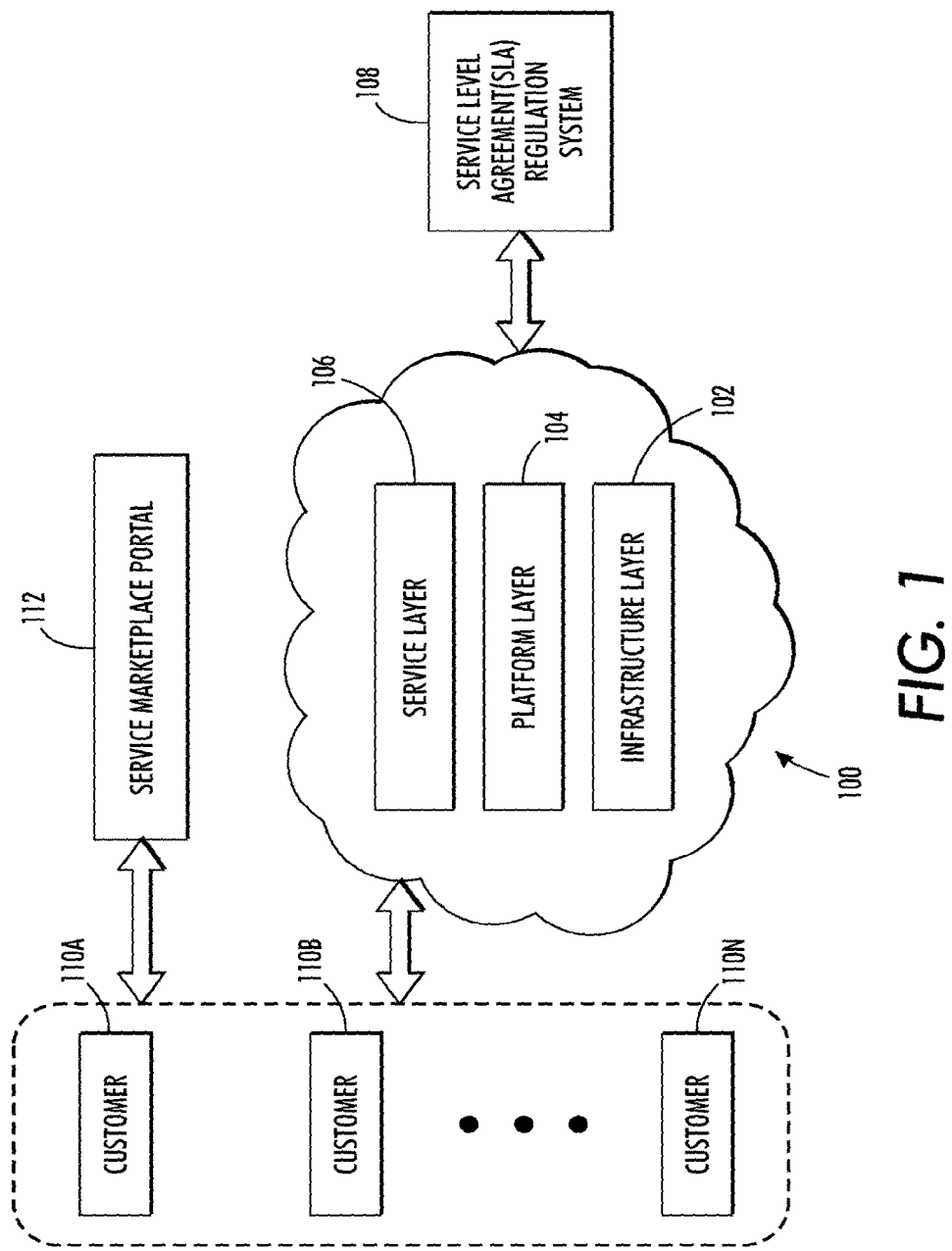
FIG. 1 illustrates an exemplary cloud architecture, in accordance with various embodiments of the present disclosure.

FIG. 1 illustrates an exemplary cloud architecture 100 (which may also be referred to as cloud 100), in accordance with various embodiments of the present disclosure. The cloud 100 may be a cloud service for use in a market place. In some embodiments, the cloud 100 may include an infrastructure layer 102, a platform layer 104, also known as middleware/virtualization layer, a service layer 106, a service level agreement (SLA) regulation system 108, a number of customers 110A-N, and a service marketplace portal 112. Each of the shown components may communicate with the others using conventional network protocols and/or any other known, related art or later developed method(s) or system(s) and will be described in detail in the following sections.

The infrastructure layer 102 may include various kinds of computing equipment, such as servers, switches, databases, and the like. The computing equipment can support operations and host the cloud services. In some embodiments, a service monitoring and management system, and a provisioning and management system (not shown) may be implemented at the infrastructure layer 102. These systems may determine power profiles of the equipment at the underlying infrastructure layer 102 when required or otherwise advantageous. The platform layer 104 offers platforms in terms of operating systems, Windows Azure, for example, which runs over the underlying infrastructure. In some implementations, at the platform layer 104, virtual machines are hosted on the actual machines or servers. Finally, at the service layer 106, various services are hosted that are used by the customers 110A-N.

Cloud-based services (or cloud services) are traditionally presented to the customers 110A-N in a way where the customers 110A-N need to input specific cloud configuration details, such as, hardware (HW), software (SW), platform, and resource requirements. Such information is usually unknown to business users, especially in an SMB marketplace. Hence, services are either over-provisioned, leading to excess energy usage, or under-provisioned, affecting performance. In an exemplary scenario, if multiple requests are received from multiple customers 110A-N, then recommending a configuration and allocating resources corresponding to these requests may be a challenging task. The customers 110A-N are spatially (i.e., geographically) distributed across the world. In addition, for a set of requests, recommending configuration based on conventional methods may lead to over-estimation or under-estimation. Over-estimation means planning to map resources, which may not be actually available, and under-estimation refers to not planning to map resources, which may be actually available. The over-estimation may occur because not all of the available resources may be planned to host each individual service request. The under-estimation can occur if the best-effort approach is extended to incorporate all the requests simultaneously or substantially simultaneously, since in the market place it is highly likely that not all services would actually be submitted for deployment by the customers 110A-N. It is therefore necessary to have some level of regulation of the recommendations based on type (class) and behavior of the customers 110A-N.

The SLA regulation system 108 of one embodiment relieves the customers 110A-N from the time and effort of entering all the configuration details for requesting various cloud-based services and also regulates the SLA prior to recommending to avoid over-estimation and under-estimation if multiple requests are received from the customers 110A-N. The SLA regulation system 108 is configured to regulate cloud configuration and corresponding SLA for multiple requests (or customers 110A-N) generated based on a few high-level details received from the customers 110A-N, past behavior of the customers 110A-N and current demand of the resources in the cloud 100. The high-level details may include, but are not limited to, performance level, location, Green Point, budget, and so forth. The budget may define the cost, which the customer is willing to pay for accessing or deploying the requested services. In some embodiments, each of the customers 110A-N can select the high-level parameters from a value set associated with one or more high-level parameter fields through the service marketplace portal 112 and various service offerings can be provided to the one or more customers 110A-N. The one or more high-level parameter fields may refer to one or more data fields in which the customers 110A-N may enter the high-level parameters.

The SLA regulation system 108 may receive a number of requests for one or more cloud services from the customers 110A-N simultaneously, or substantially simultaneously. The customers 110A-N may be categorized into one or more classes depending on one or more predefined criteria. An example of the predefined criteria may include classifying the customers 110A-N into classes, such as a gold class, a silver class, a bronze class, and so forth depending on frequency of requests received from the customers 110A-N over a period of time. Further, the customers 110A-N may be classified into multiple classes based on an initial registration process. For example, the customers 110A-N may register themselves with a service provider of cloud services before requesting or accessing the cloud services. In an embodiment, the SLA regulation system 108 is configured to assign a priority to the one or more services, such that a service with highest probability of acceptance is given higher preference to get the resources.

The SLA regulation system 108 can be configured to process the requests based on at least one of a probability distribution of actually deploying a requested service, a budget of the customer(s) 110A-N, and an expected demand of the requested service based on the probability distribution. The probability of deployment refers to a measure (or percentage) of actually deploying the requested services by a customer of the customers 110A-N. For example, a customer may not deploy a SLA after allocation in which case, the probability of deployment is low. The SLA regulation system 108 may also prioritize the multiple requests in a queue based on a descending order of the probability of deployment of the requested one or more cloud services and the price offering. The price offering defines a sample price, which may be offered by the SLA regulation system as part of SLA for providing the requested services. In an embodiment, the SLA regulation system 108 may provide the customers 110A-N with the price offering after receiving the requests for one or more cloud services. There may be a number of resources available in the computing cloud 100 for deployment of cloud services. The resources can be servers, computers, virtual machines, software applications, and so forth. The SLA regulation system 108, while calculating the price offering or generating the cloud configuration or SLA, may reduce, for each of the requests, an availability of resource(s) based on an expected demand of the one or more cloud services by previous requests in the queue.

The SLA regulation system 108 may also generate a number of cloud configurations along with a Service Level Agreements (SLAs) for each of the customers 110A-N based on at least one of the prioritization of the requests, a class of each of the customers 110A-N, past behavior of each of the customers 110A-N, and a current demand of the cloud services in the computing cloud. A separate cloud configuration and SLA may be generated for each of the customers 110A-N. The SLA regulation system 108 may maintain details about each customer's 110A-N past behavior, resources, each customer's 110A-N basic information, and so forth. The SLAs of the multiple customers 110A-N may include different price offering is for the one or more cloud services. Further, the price offering in each of the SLAs may be provided as a range, including an upper limit and a lower limit for deploying the one or more cloud services. For example, the price offering for deploying a cloud service may be $100-$300. The SLA regulation system is also configured to determine, for each of the requests, a probability of deployment of the one or more services corresponding to the price offering. In an embodiment, the SLA regulation system 108 may determine a price offering for each of the multiple requests based on a posterior distribution of demand after observing the current demand of services by the customers 110A-N, and the prior distribution of resources required for deploying the requested one or more services to the customers 110A-N.

In an embodiment, the SLA regulation system 108 can search for an enhanced, improved, and is some case an optimal or best cloud configuration for each of the requests (or customers 110A-N) based on at least one of the prioritization of requests, a class of each of the customers, past behavior of the customers 110A-N, and a current demand of the one or more cloud services in the cloud 100. For example, a customer 110A of a gold class may be offered a lower price for a particular cloud service as compared to another customer 110C of a bronze class for the same cloud service. In an exemplary scenario, a customer 110B having a high probability of deployment in the past may be offered maximum resources for deploying a service than another customer 110C having a low probability of deployment. Further, the SLA regulation system 108 may generate the cloud configuration(s) along with the SLA(s) by estimating at least one of a budget, a Green Point, a performance level, and energy consumption for each possible cloud configuration based on the received high-level parameters.

In one embodiment, the SLA regulation system 108 may recommend the generated cloud configurations and the associated SLAs through a number of output interfaces (see FIG. 2) to multiple customers 110A-N. The cloud configurations and the SLAs may be recommended to each of the customers 110A-N based on an expected availability of resources required for deploying the requested one or more cloud services in the computing cloud 100.

Further, the SLA regulation system 108 can be configured to allow each of the customers 110A-N to negotiate terms of its associated SLA when the customer 110 (hereinafter, customer 110 refers to a single customer) is not satisfied with the recommended SLA. Further, the SLA regulation system 108 may receive one or more new inputs from the customer 110 to fine tune or modify the previously recommended SLA, or generate a new SLA based on new inputs until the customer 110 is satisfied with the SLA. In some embodiments, each of the customers 110A-N can negotiate the terms of the SLA based on a trade-off between the one or more high-level parameters at a service layer of the cloud 100. Further, the SLA regulation system 108 may change the terms of the SLA based on the service level SLA negotiation or inputs received from the customer 110 (or customers 110A-N). Further, the SLA regulation system 108 may generate the multiple SLAs for each of the customers 110A-N, such that revenue of a service provider is enhanced, increased, or in some cases, maximized, while enhancing, improving or even ensuring customer satisfaction and/or quality-of-recommendation. This procedure enable the customers 110A-N to finalize an SLA for deploying the requested cloud services.

Thereafter, the cloud 100 may provide the one or more cloud services based on the negotiated or finalized SLAs to each of the customers 110A-N. Further, the price offering in the generated SLAs (or recommended SLAs) is such that a potential revenue for the service provider is enhanced, increased, or even maximized, while taking into account the probability distribution of the customer actually deploying the services with one or more of the high-level parameters.

Figure 2:
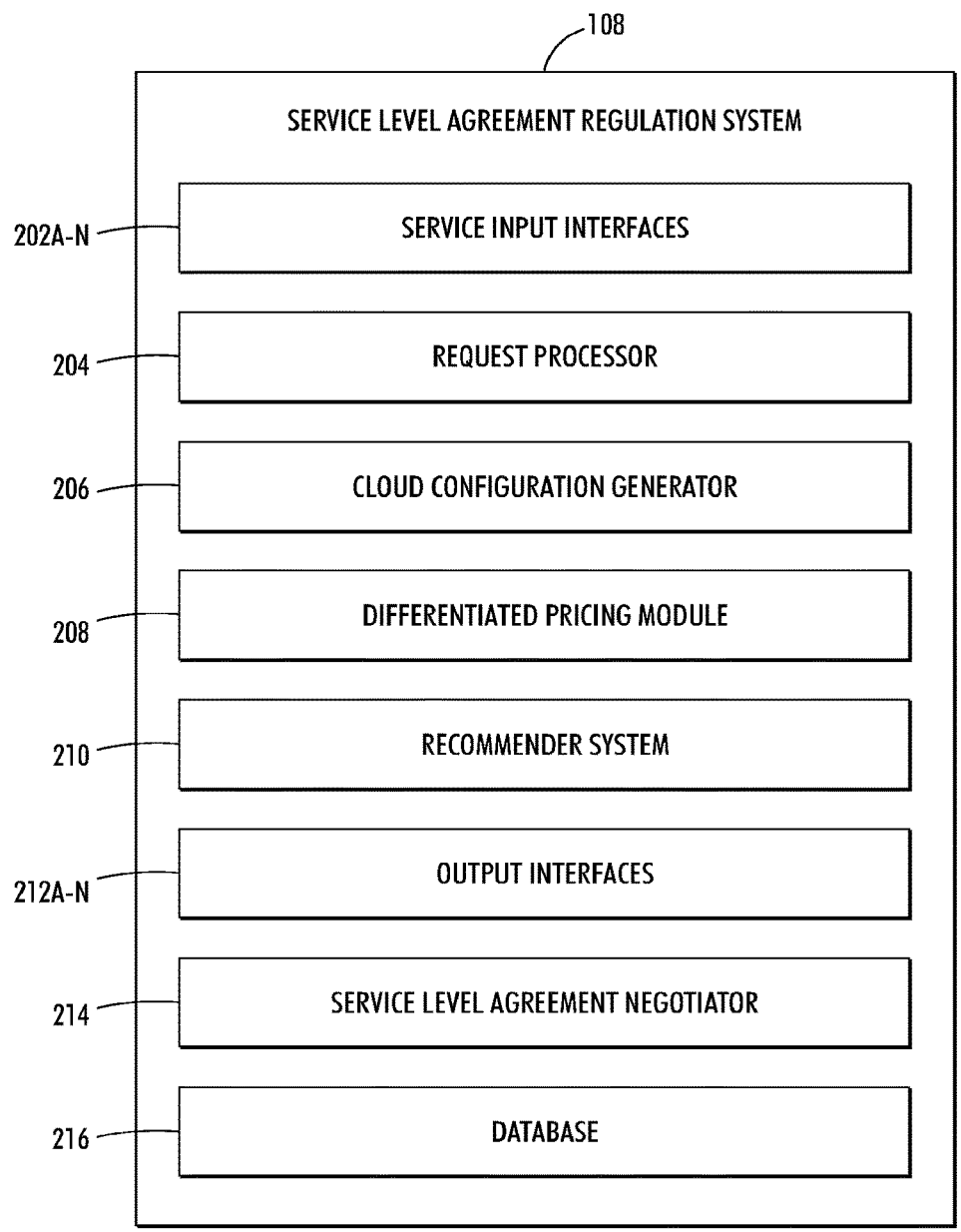
FIG. 2 illustrates structural components of the SLA regulation system of FIG. 1, in accordance with an embodiment of the present disclosure.

FIG. 2 illustrates structural components of the SLA regulation system 108 of FIG. 1, in accordance with an embodiment of the present disclosure. The SLA regulation system 108 may include a number of service input interfaces 202A-N, a request processor 204, a cloud configuration generator 206, a differentiated pricing module 208, a recommender system 210, a number of output interfaces 212A-N, a service level agreement (SLA) negotiator 214 and a database 216. The service input interfaces 202A-N may include one or more data fields to allow the customers 110A-N to enter high-level parameters. As discussed with reference to FIG. 1, the customers 110A-N may request one or more cloud services by entering one or more high-level details in the service input interfaces 202A-N. The high-level parameters may include at least one of, but not limited to, a performance level, a Green Point, a budget, and a location. The service input interfaces 202A-N may also allow the customers 110A-N to enter one or more service inputs. The service inputs may include at least one of a service name and one or more service specific parameters. Each of the customers 110A-N may select the high-level parameters from a value set associated with one or more high-level parameter fields of each of the service input interfaces 202A-N.

The request processor 204 is configured to receive these one or more requests from the customers 110A-N simultaneously or substantially simultaneously. Further, the request processor 204 may process these requests based on at least one of a probability distribution of actually deploying a requested service, a budget of each of the customers 110A-N, and an expected demand of the requested service based on the probability distribution. A budget of a customer 110 may be received as an input. In some embodiments, the budget of the customer 110 may be estimated based on the past behavior of the customer 110. The probability distribution refers to the probability of actually deploying the requested service by the customers 110A-N in past similar scenarios, on allocation of resources by the cloud service provider. For example, a customer 110A of the customers 110A-N may request a service that requires ten servers and a service that requires eight servers, even though in the past the customer 110 has always deployed a service requiring eight servers. Therefore, the probability of a service requested by the customer 110A requiring eight servers is more than the service requiring ten servers. The request processor 204 is further configured to determine, for each of the requests, a probability of deployment of the one or more services corresponding to the price offering. This means that the request processor 204 may determine the probability of deploying a service at an offered price. Based on this probability of deployment for each of the requested services, a probability distribution may be maintained by the SLA regulation system 108 (or the request processor 204) for all of the customers 110 A-N.

The request processor 204 is further configured to prioritize the requests in a queue based on a descending order of the probability of the requested one or more cloud services and the price offering (offered by the SLA regulation system 108). The request processor 204 may arrange the requests in descending order of probability of the requested one or more cloud services and the price offering in the queue. The request processor 204 is further configured to reduce, for each of the requests, an availability of resources based on an expected demand of the one or more cloud services by previous requests in the queue. This means that, the request processor 204 may reduce the number of available resources as one or more requests of the queue may be processed based on the demand of the cloud services.

The cloud configuration generator 206 is configured to generate a cloud configuration along with a service level agreement (SLA) for each of the customers 110A-N based on at least one of the prioritization of the requests, a class of each of the customers 110A-N, past behavior of each of the customers 110A-N, and a current demand of the cloud services in the cloud 100. The SLA regulation system 108 may include a database 216 to store details about class associated with each of the customers 110A-N, past behavior of the customers 110A-N, and probability deployment distribution for the various cloud services for each of the customers 110A-N. The SLAs for each of the customers 110A-N may be generated such that revenue of a service provider is enhanced, improvised or even maximized, while enhancing, improving or even ensuring customer satisfaction and/or quality-of-recommendation. In an embodiment, the recommender system 210 may generate the cloud configurations and SLAs for the customers 110A-N. Further, the SLAs of the customers 110A-N may include a differentiated price offering for the one or more cloud services for different customers 110A-N. For example, an SLA of the customer 110A may include a price offering of $400, and an SLA of the customer 110C may include price offering of $600 for deploying same cloud service in the computing cloud 100.

The differentiated pricing module 208 may calculate or estimate different price offerings for each of the customers 110A-N. The differentiated pricing module 208 is further configured to determine price offerings for each of the requests based on past distribution of demand after observing the current demand of the customers 110A-N and the prior distribution of resources for deploying the requested one or more services to these customers 110A-N. Further, differentiated pricing module 208 is configured to generate a low price for the one or more cloud services if a performance level entered by each of the customers 110A-N is low.

The recommender system 210 is configured to recommend the generated cloud configurations and the SLAs through the multiple output interfaces 212A-N to the customers 110A-N. Further, the price offering in the SLAs may be provided as a range, including an upper limit and a lower limit for deploying the one or more cloud services. The recommender system 210 is configured to search for an enhanced, improved, and in some cases optimal or best cloud configuration for each of the requests, based on at least one of the prioritization of requests, a class of each of the customers 110A-N, past behavior of each of the customer 110A-N, and a current demand of the one or more cloud services in the cloud 100. The recommender system 210 can be further configured to assign a priority to the one or more cloud services, such that a cloud service with highest probability of acceptance is given higher preference to receive or allocate the resources.

Further, each of the output interfaces 212A-N may include one or more buttons having at least one of a deploy button and a cancel button. Each of the customers 110A-N may initiate a negotiation of the SLA by selecting the cancel button if the customer 110 is not satisfied with the recommended SLA (or cloud configuration). The SLA negotiator 214 is configured to allow each of the customers 110A-N to negotiate terms of its associated SLA. The cloud 100 may provide the one or more cloud services based on the negotiated multiple SLAs to each of the customers 110A-N. The SLA negotiator 214 is further configured to perform the steps of receiving, generating and recommending until the customer 110 is satisfied with the SLA. Each of the customers 110A-N may negotiate the terms of its associated SLA based on a trade-off between the one or more high-level parameters at a service layer of the cloud 100. The SLA negotiator 214 is further configured to change the terms of the SLA based on the service level SLA negotiation. In an embodiment, the cloud configuration generator 206 may modify the SLA based on the received inputs from the customers 110A-N.

Figure 3:
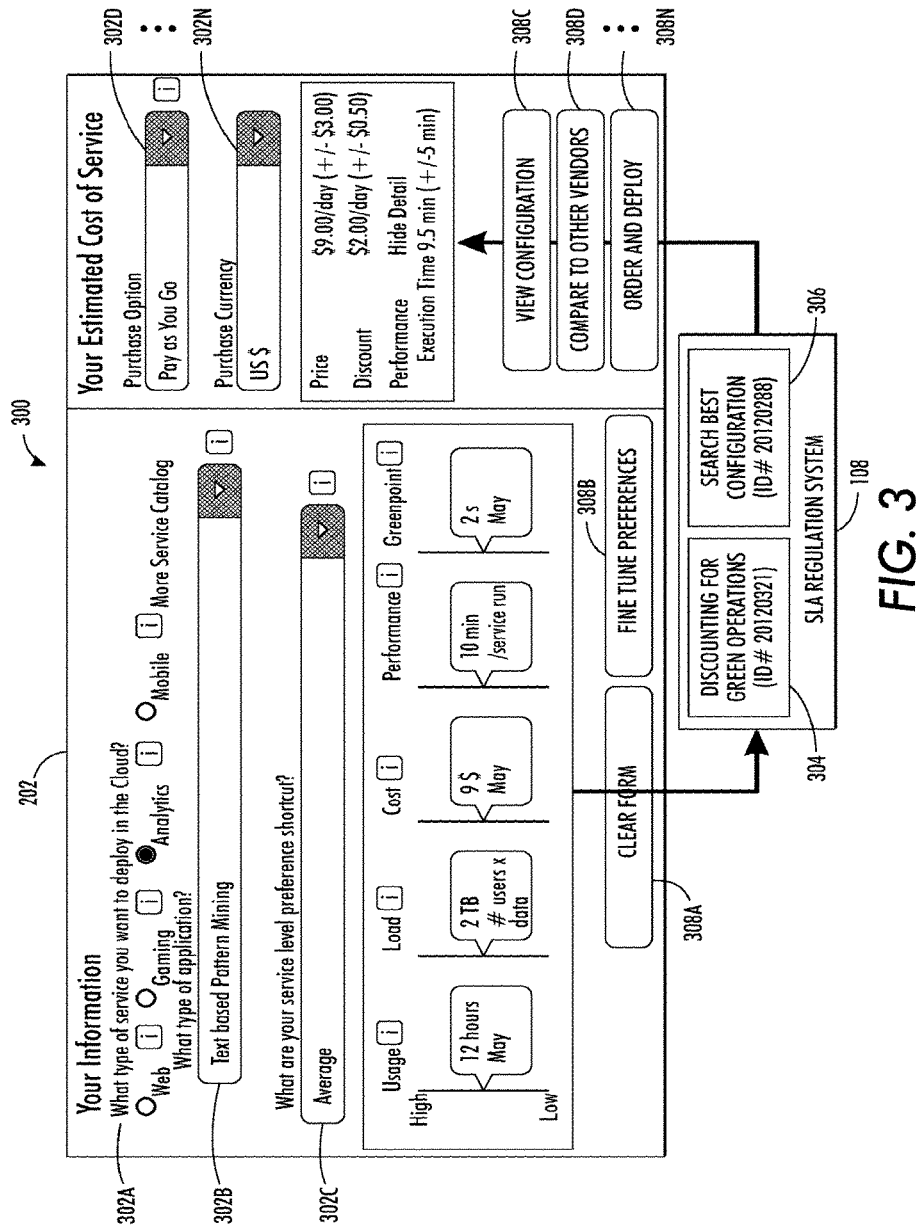
FIG. 3 shows an exemplary screenshot for configuring the SLA regulation system, in accordance with an embodiment of the present disclosure.

FIG. 3 shows an exemplary screenshot 300 of the SLA regulation system 108 for configuring the SLA regulation system, in accordance with an embodiment of the present disclosure. As discussed with reference to FIG. 2, the SLA regulation system 108 includes multiple service input interfaces 202A-N. The customers 110A-N can interact with the service input interface 202. The service input interface 202 may include one or more fields 302A-N, in which the customers 110A-N may input one or more high-level parameters or service inputs. The screenshot 300 may further include the structural components 204-216 of the SLA regulation system 108 (not shown in FIG. 3) operating in the background/at a backend. The screenshot 300 may receive more than one request for cloud services from multiple customers 110A-N at a time. Further, the one or more requests may be for the same cloud services or resources. As shown, each of the service input interfaces 202A-N may include one or more buttons 308A-N through which the customer 110 may submit the details to the SLA regulation system 108. The buttons 308A-N may include, but are not limited to, a 'Clear Form' button, a 'Fine Tune Preference' button, a 'View Configuration' button, a 'Compare to other Vendors Button' button, an 'Order and Deploy' button, and so forth. It may not be necessary for the customer 110 to enter low-level details about the cloud configuration, such as hardware, platform, number of CPUs, number of virtual machines, etc., and instead the customer may only enter service-specific parameters like Green Point value, performance level, budget, and so forth. The SLA regulation system 108 can automatically generate and recommend a cloud configuration and SLA to multiple customers 110A-N based on one or more high-level configuration details received from multiple customers 110A-N.

At the back-end (as shown in FIG. 3), the SLA regulation system 108 may take the user preferences (e.g., usage level, load level, cost (budget), performance, and Green Point) as input and search for the best configuration that is closest to user preferences and then outputs the cloud configuration and the corresponding SLA through the output interfaces 212A-N. In an embodiment, the cloud configuration generator 206 can generate the cloud configurations along with the SLA recommendations based on a demand of the customers 110A-N for service delivery, availability and dependency of hardware and software in the cloud 100. The recommender system 210 of the SLA regulation system 108 may plan the cloud configurations and SLAs for the requested services for different customers 110A-N based on the high-level parameters as input by these customers 110A-N. The recommender system 210 may also recommend the generated cloud configurations and the SLAs to multiple customers 110A-N through the output interfaces 212A-N. The recommender system 210 may determine probability of deployment corresponding to the budget to be offered for all the requests. As shown, the differentiated pricing module 208 may perform discounting in price offerings based on Green operations (304). The SLA regulation system 108 (or recommender system 210) can effectively search for an enhanced, improved, or even best configuration from available resources for multiple requests received from the multiple customers 110A-N based on the probability of deployment, current demand of resources, and so forth. The recommender system 210 runs at a backend of the snapshot 300. Further, the customer 110 may select the "View Configuration" button 308C to view the sample cloud configuration and SLA. The customer 110 may negotiate or fine-tune the sample cloud configuration or the SLA by selecting the 'Fine Tune Configuration' button 308B. The SLA regulation system 108 may regulate the recommendations based on customer type and behavior based on dynamics of a synchronous or substantially synchronous cloud environment, and accordingly offers price offering as a range to customers 110A-N.

The SLA regulation system 108 includes the SLA negotiator 214 that allows the customers 110A-N to negotiate and to regulate the SLA recommendations based on their budget as well as corresponding energy-performance trade-offs. In one embodiment, the SLA regulation system 108 implements a game-theoretic approach to offer differentiated price ranges to different customers 110A-N depending on the type and behavior of the customers 110A-N. The differentiated pricing module 208 may enhance, increase or even maximize revenue through a game theoretic approach between customers 110A-N and the service provider. The differentiated pricing module 208 may design a pricing based game (explained in detail in FIGS. 8A-8C) between the customers 110A-N and the service provider(s) in such a way that the revenue of the service provider(s) is enhanced, increased, or even maximized, while enhancing, improving, or even ensuring customer satisfaction, quality-of-recommendation, and/or allowing customers 110A-N to trade-off between budget, performance, and energy-efficiency. After negotiating, each of the customers 110A-N may order and deploy the cloud services by selecting the 'Order and Deploy' button 308N.

Figure 4:
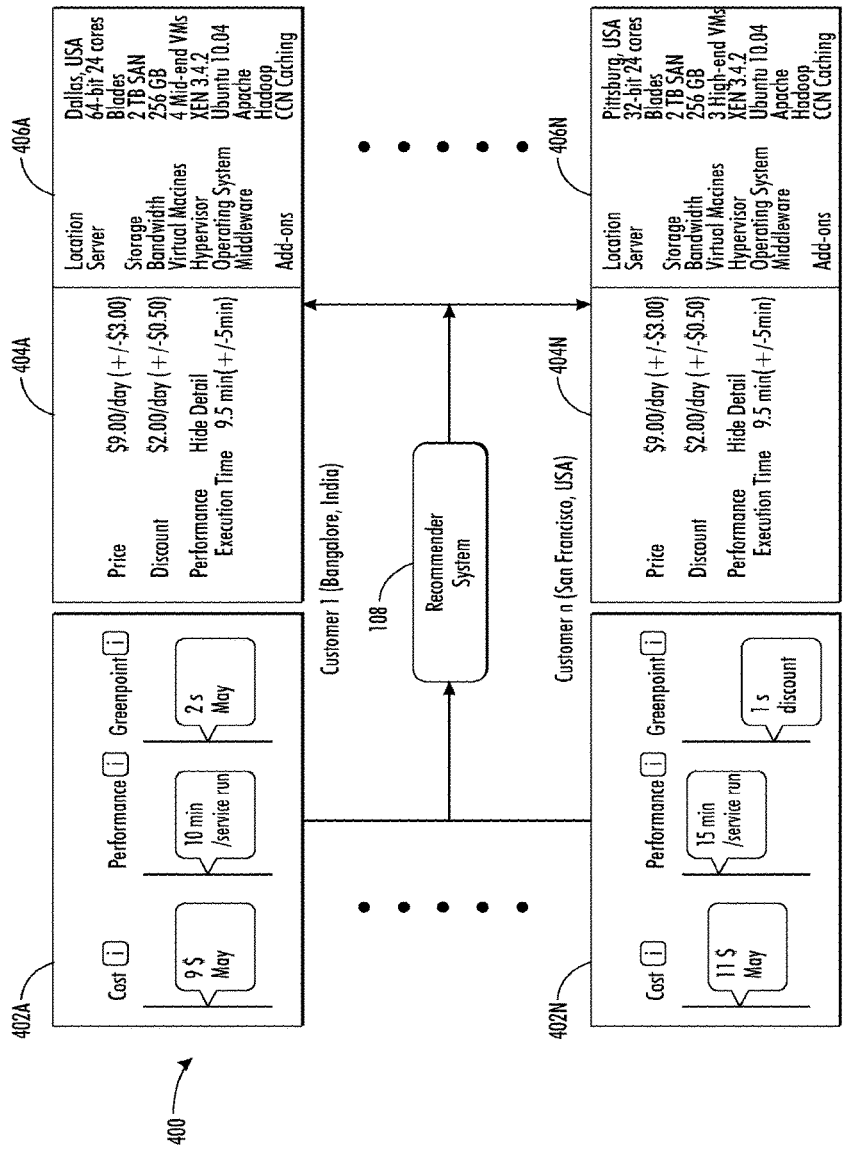
FIG. 4 illustrates an exemplary embodiment of the SLA regulation system when receiving one or more inputs from multiple customers.

FIG. 4 illustrates an exemplary embodiment (block diagram 400) of the SLA regulation system 108 receiving one or more inputs from multiple customers 110A-N. The SLA regulation system 108 may take service preference inputs via service input interfaces 402A-N from the multiple customers 110A-N. Further, the SLA regulation system 108 may process the inputs received from multiple customers 110A-N and generate their corresponding recommendations, such as price offerings 404A-N and cloud configurations or SLAs 406A-N, respectively. The customers 110A-N may be spatially separated. For example, customer A may be present in Sydney, Australia, while customer N may be present in San Francisco, USA.

Figure 5:
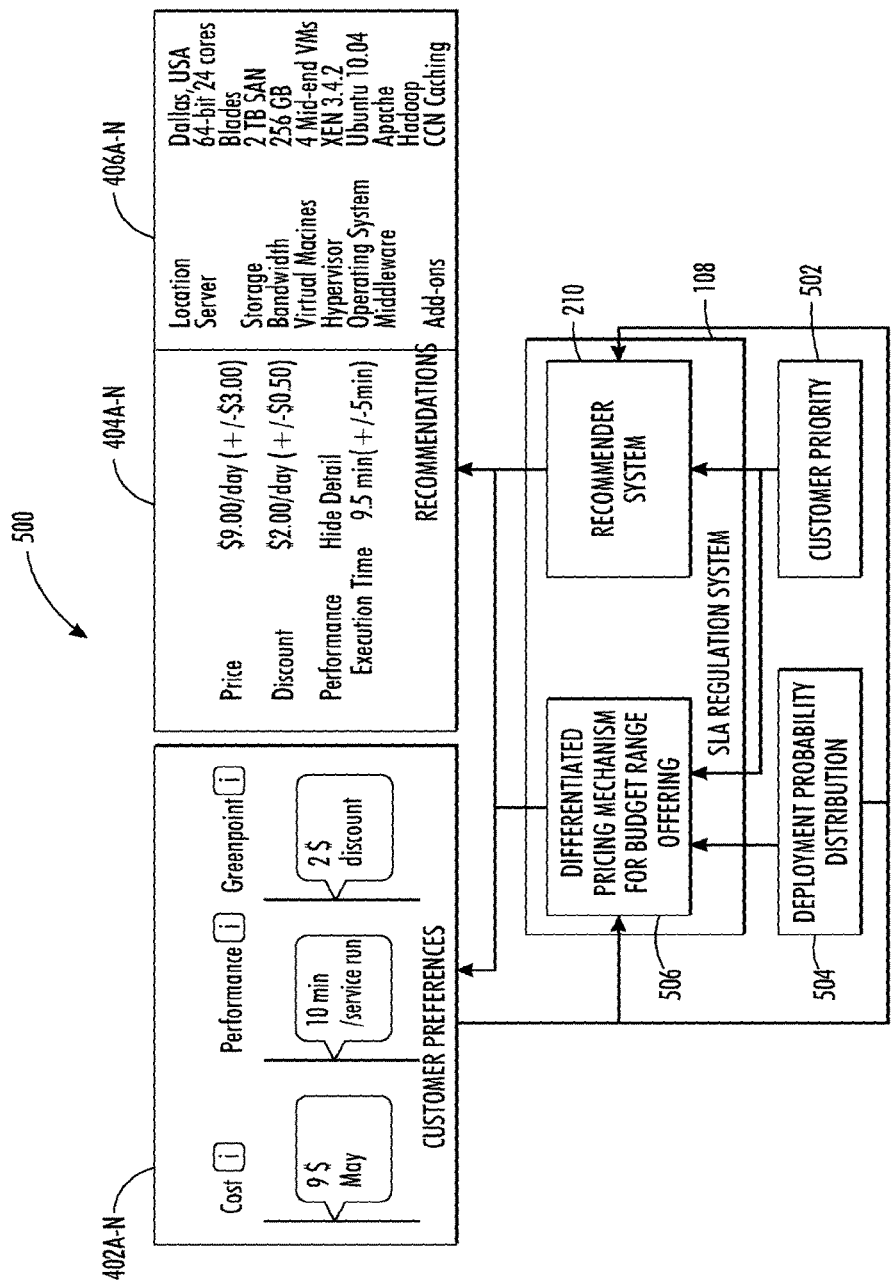
FIG. 5 illustrates an exemplary embodiment of a system architecture for the SLA regulation system for handling multiple requests.

FIG. 5 illustrates an exemplary embodiment of a system architecture 500 for the SLA regulation system 108 to handle multiple requests, in accordance with an embodiment of the present disclosure. As discussed with reference to FIGS. 1 and 4, the SLA regulation system 108 may receive one or more inputs 402A-N from the customers 110A-N for requesting one or more services from the service providers in the cloud 100. As shown, the SLA regulation system 108 may use one or more mechanisms and information stored in the database 216 to generate price offerings 404A-N and cloud configurations or SLAs 406A-N for multiple customers 110A-N. The SLA regulation system 108 may use information, such as customer priority 502, deployment probability distribution 504, and differentiated pricing mechanisms for price range offerings from the database 216 to generate SLAs for multiple customers 110A-N. Each of the customers 110A-N may register with the service provider to access one or more cloud services. Further, the customers 110A-N may be classified into one or more classes such as, but not limited to, a gold class, a silver class, and a bronze class. In an embodiment, the customer priority can be input by the customers 110A-N during registration, or can also be learned by the recommender system 210 based on past activities of the customers 110A-N. Further, the request processor 204 may process the one or more requests received from the customers 110A-N, and may prioritize them based on customer information and determine customer priority information 502. Further, the recommender system 210 may determine, for each of the requests, a probability of deployment 504 of the one or more services corresponding to the price offering.

The recommender system 210 is further configured to assign a priority to the one or more cloud services, such that a cloud service with highest probability of acceptance is given higher preference to get the resources. Further, the recommender system 210 may determine recommendation acceptance probability distribution by monitoring the acceptance of the cloud configuration or the recommended SLA by the customers 110A-N over a period of time.

In an embodiment, the differentiated pricing module 208 may determine a differentiated price offering (or budget offering) 506 for each of the requests (customers 110A-N) based on a past distribution of demand after observing the customers' current demand and the prior distribution of resources for deploying the requested one or more services to these customers 110A-N. The differentiated pricing module 208 may further generate a low price for the one or more cloud services if a performance level entered by a customer of the customer 110A-N is low.

Figure 6:
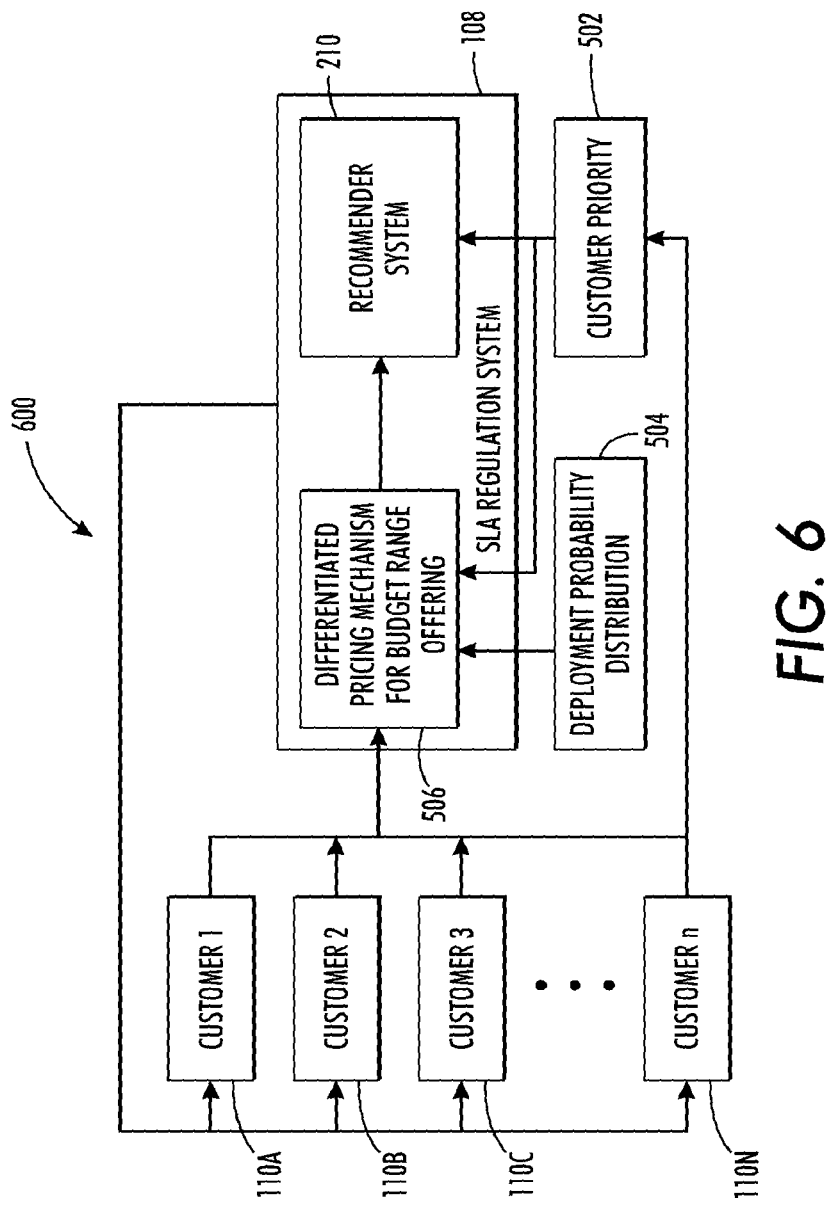
FIG. 6 illustrates an exemplary screenshot of the SLA regulation system.

FIG. 6 illustrates an exemplary screenshot 600 of the SLA regulation system 108, in accordance with an embodiment of the present disclosure. As discussed with reference to FIGS. 1-2, the request processor 204 may receive and process requests received from the multiple customers 110A-N. The SLA regulation system 108 may generate cloud configurations and SLAs for different customers 110A-N. Further, the SLAs for different customers 110A-N may include different price offerings, as determined or calculated by the differentiated pricing module 208 based on one or more factors, such as past behavior and class of the customers 110A-N.

Figure 7:
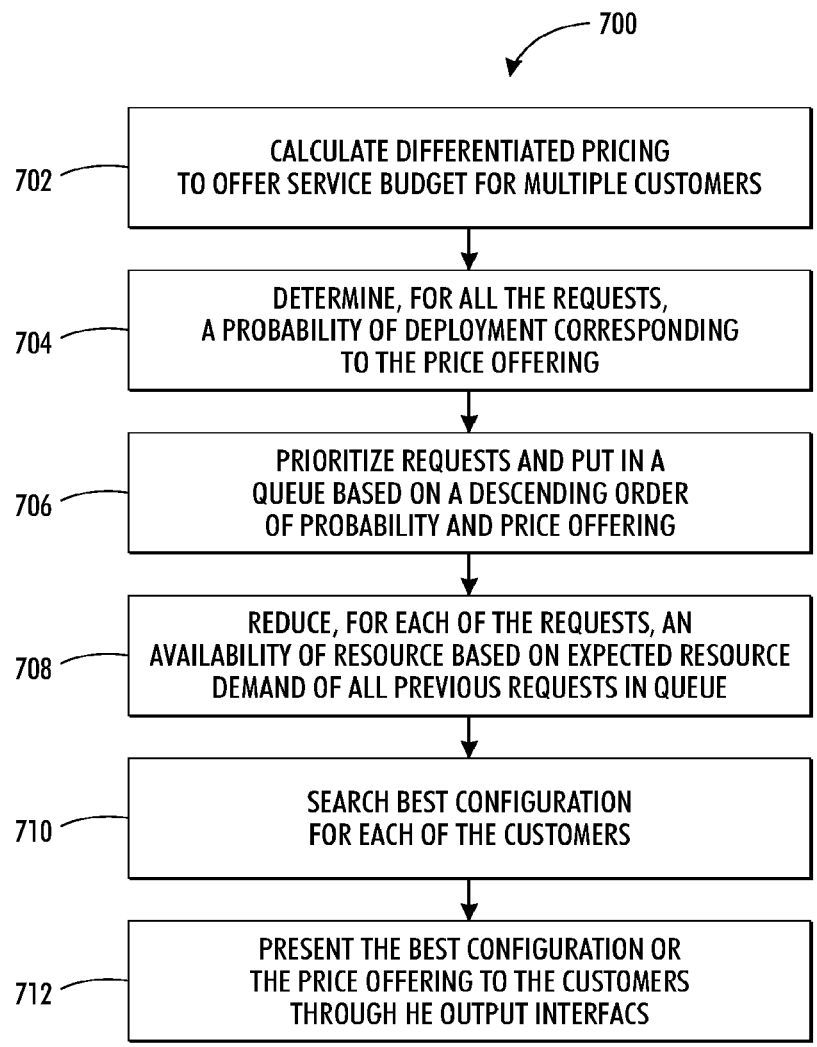
FIG. 7 is a flowchart illustrating various steps of a method 700 for regulating service level agreements (SLAs) by the SLA regulation system 108, in accordance with an embodiment of the present disclosure.

FIG. 7 is a flowchart illustrating various steps of a method 700 for regulating service level agreements (SLAs) by the SLA regulation system 108, in accordance with an embodiment of the present disclosure. As discussed with reference to FIG. 2, the SLA regulation system 108 includes one or more service input interfaces 202A-N, the request processor 204, the cloud configuration generator 206, the differentiated pricing module 208, the recommender system 210, the one or more output interfaces 212A-N, the SLA negotiator 214, and the database 216. As discussed with reference to FIG. 1, the customers 110A-N may request one or more cloud services in the cloud 100 via the service input interfaces 202A-N.

At step 702, differentiated pricing to offer as a service budget to the customers 110A-N may be calculated by the differentiated pricing module 208. The differentiated pricing may be calculated based on the deployment probability distribution 712A, as explained with regard to FIG. 2. In an embodiment, the differentiated pricing module 208 may use any related art or later developed algorithm to calculate the price offering for different customers 110A-N. In some embodiments, the differentiated price offering may be presented to the customers 110A-N through the output interfaces 212A-N at step 712.

At step 704, for all received requests, probability of deployment at a corresponding price offering (i.e. sample price offering) is determined. In an embodiment, the recommender system 210 may determine the probability of deployment. At step 706, the requests may be prioritized and put in a queue based on a descending order of probability of deployment and price. In an embodiment, the request processor 204 may prioritize the requests. At step 708, for each of the requests in the queue, the availability of resources may be reduced in the computing cloud 100 based on an expected resource demand of all previous requests in the queue. As discussed with reference to FIGS. 1-2, the database 216 may store the details about the resources and their availability in the cloud 100. In an embodiment, the request processor 204 may reduce the availability of resources for each of the requests in the queue and may use information such as, deployment probability distribution, customer priority, customer preferences (or high-level parameter inputs), and resource availability information.

Then, at step 710, an enhanced or best configuration for each of the customers 110A-N may be searched. The enhanced or best configuration for each of the customers 110A-N may include cloud configuration, price offering, and SLA. In an embodiment, the enhanced or best configuration may be searched by the SLA regulation system 108 using information such as resource availability information, budget, performance and energy estimations. Further, in an embodiment, steps 704 to 710 may be performed by the recommender system 210.

Figure 8A:
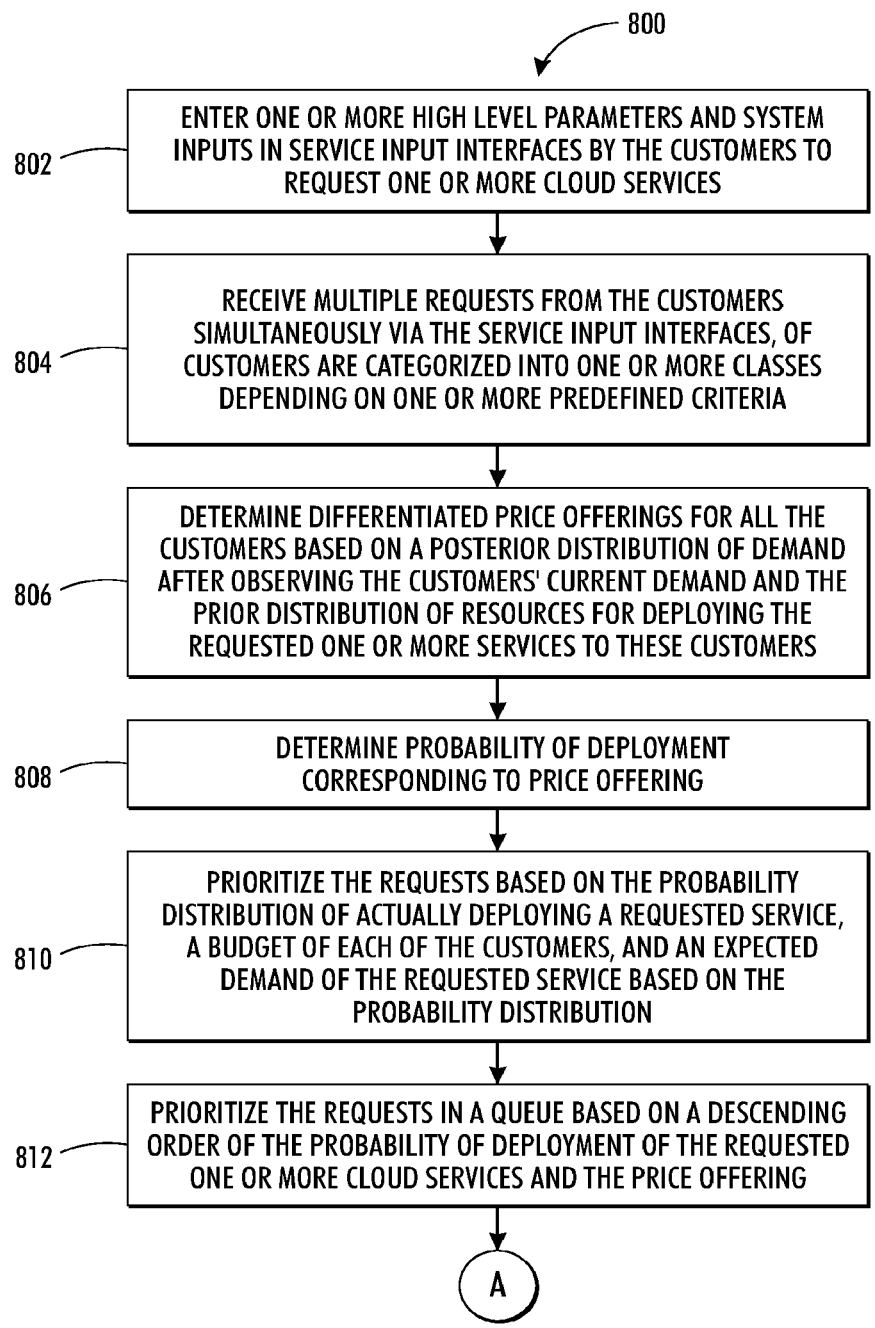
FIGS. 8A-8C illustrates a method for providing one or more cloud services to a number of customers in the computing cloud, in accordance with various embodiments of the present disclosure.
Figure 8B:
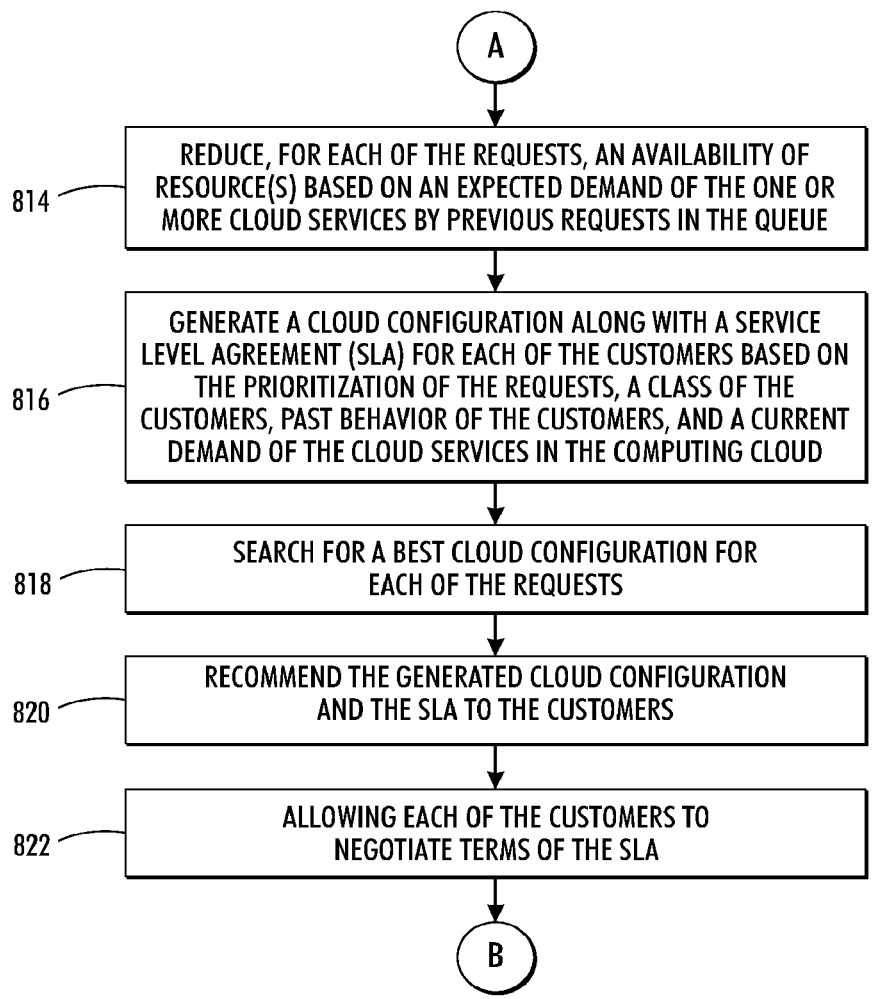
Figure 8C:
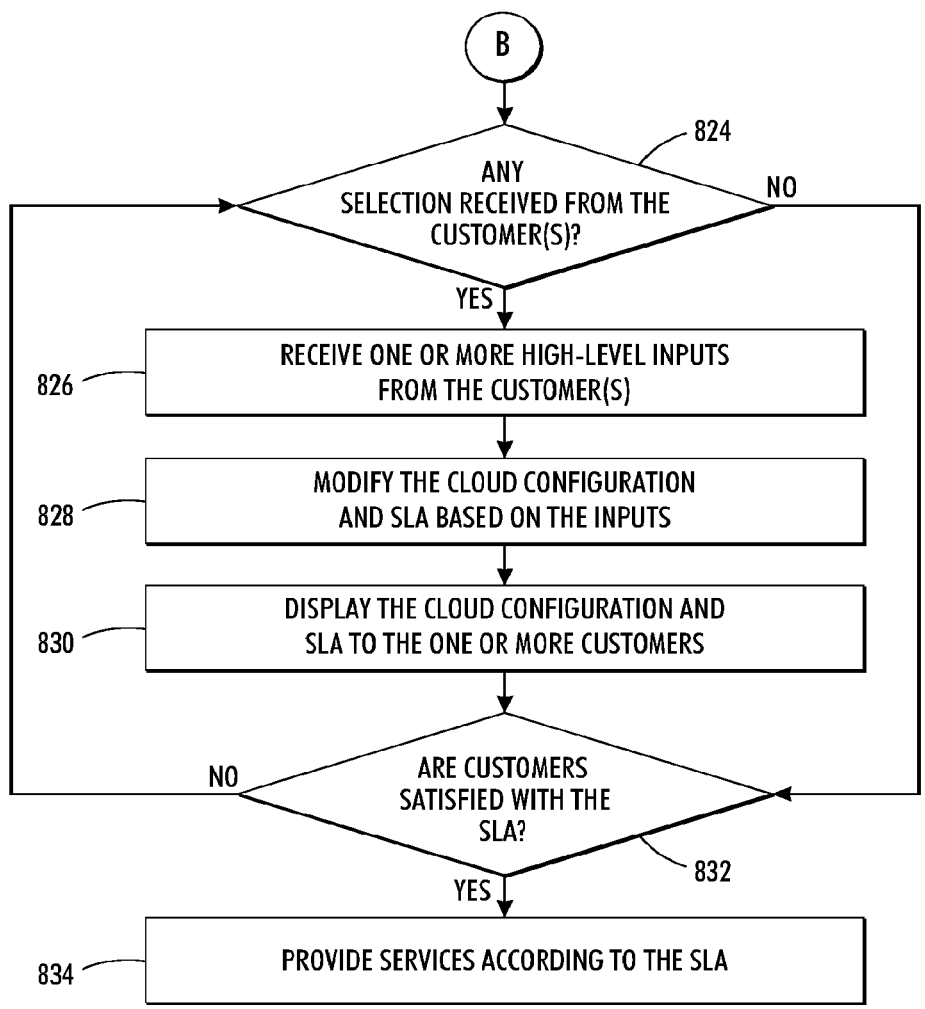

FIGS. 8A-8C illustrate a method 800 for providing one or more cloud services to a number of customers 110A-N in the cloud architecture 100, in accordance with various embodiments of the present disclosure. As discussed with regard to FIGS. 1-2, the SLA regulation system 108 may receive and process requests for various cloud services received from the customers 110A-N simultaneously or substantially simultaneously. Further, the SLA regulation system 108 is configured to generate cloud configurations and regulate and SLAs for the customers 110A-N.

At step 802, the customers 110A-N may enter one or more high-level parameters or service inputs in their respective service input interfaces 202A-N. At step 804, one or more requests for the one or more cloud services may be received by the request processor 204 of the SLA regulation system 108 simultaneously or substantially simultaneously. The customers 110A-N may be classified or categorized into multiple classes based on predefined criteria. At step 806, differentiated price offerings for all the customers may be determined based on a past distribution of demand after observing the customers' current demand and the prior distribution of resources for deploying the requested one or more services to these customers 110A-N. In an embodiment, the differentiated pricing module 208 may determine the price offerings for different customers 110A-N. At step 808, a probability of deployment of the one or more services at an offered or corresponding price offering may be determined by the recommender system 210.

At step 810, the request processor 204 may process the requests and prioritize the requests based on the probability distribution of actually deploying a requested service, a budget of each of the customers 110A-N, and an expected demand of the requested service based on the probability distribution. At step 812, the requests may be prioritized in a queue based on a descending order of the probability of deployment and price offering (a sample price).

At step 814, an availability of resources may be reduced for each of the requests based on an expected demand of the one or more cloud services by previous requests in the queue. In an embodiment, the request processor 204 may reduce the availability of the resources while processing the previous requests in the queue. At step 816, a number of cloud configurations along with the SLAs may be generated for each of the customers 110A-N based on the prioritization of the requests, a class of each of the customers 110A-N, past behavior of the customers 110A-N, and a current demand of the cloud services in the computing cloud 100. In an embodiment, the cloud configuration generator 206 may generate the cloud configurations and the SLAs. In another embodiment, the recommender system 210 may generate the cloud configurations and SLAs.

At step 818, an enhanced, optimal or best cloud configuration and an enhanced, optimal or best SLA for each of the customers 110A-N may be searched. In an embodiment, the recommender system 210 may search for the enhanced or best configuration and the SLA. Then, at step 820, the generated cloud configurations and SLAs may be recommended to the customers 110A-N. In an embodiment, the recommender system 210 can recommend the cloud configurations and SLAs to the customers 110A-N. At step 822, each of the customers 110A-N may be allowed to negotiate one or more terms of the SLA(s). In an embodiment, the customers 110A-N may negotiate the terms of the SLAs via the SLA negotiator 214, if they are not satisfied with the recommended SLAs. Thereafter, at step 824, it is checked whether or not any selection from the customers 110A-N is received. In case one or more customers 110A-N have not provided any selections or inputs for negotiations, then step 832 is executed. At step 832, it is checked whether the customer is satisfied or not, then step 834 may be performed. At step 834, the cloud 100 may provide the cloud services according to the SLA.

If at step 824, selection(s) or input(s) is received from one or more of the customers 110A-N, then step 826 may be performed. At step 826, one or more high-level inputs may be received from the customers 110A-N. Then, at step 828, cloud configuration(s) and the SLA(s) may be modified based on the selection information or the inputs received from the customers 110A-N. At step 830, the cloud configuration(s) and the SLA(s) may be displayed or presented to the customers 110A-N via the one or more output interfaces 212A-N. Thereafter, steps 832 and 834 are executed as explained above.

Exemplary Equations and Calculations

Embodiments of the present disclosure include a method for calculating or estimating differentiated price offerings of cloud services for different customers 110A-N. The disclosed method for calculating price offerings is based on a pricing based game mechanism. The following exemplary assumptions and notations are used to explain the pricing based game mechanism.

Exemplary Notations Used for Calculating Differentiated Price Offerings for Multiple Customers The disclosed methods and systems for calculating differentiated pricing and providing cloud services may use many equations and short notations as explained in subsequent sections. 'K' may refer to Total number of levels for performance. 'pg' may refer to Price for Gold Customer at full performance (at K). 'ps' may refer to Price for Silver Customer at full performance (at K). 'pb' may refer to 'Price for Bronze Customer at full performance (at K)'. 'D(p,l)' may refer to 'Discounted price at performance level 'l' given price 'p". Discount may be given for high green points or less performance, i.e. less computing resources. 'Pric(p,l)' may refer to 'Probability that the Customer i in class 'c' accepts price 'p' at level 'l''. 'q' may refer to 'Total demand for resources'. 'ng' may refer to 'Total number of Gold customers'. 'ns' may refer to 'Total number of Silver customers'. 'nb' may refer to 'Total number of Bronze customers'. 'n' may refer to 'Total number of customers. (n=ng+nb+ns)'. 'C(q)' may refer to 'Total cost incurred to avail 'q' resources'.

Exemplary Assumptions for Calculating the Differentiated Price Offerings for Multiple Customers One assumption is that there are three categories/classes of customers, namely gold class, silver class, and bronze class. This disclosed pricing based game mechanism can be easily generalized to any number of differentiated classes of customers 110A-N without any limitations. Another assumption is that there is a one to one correspondence between the Green Points and the performance level(s) at which the customer 110 decides to operate. For example, if the required performance level is higher, then the Green Point level can be lower. A further assumption is that the customers 110A-N may be selfish and rational, but myopic. In other words, the customers 110A-N may always try to enhance, improve, or maximize their benefits in the current period. As discussed with reference to FIG. 2, the recommender system 210 is configured to learn about customer's (110A-N) behavior and store the information in the database 216. The recommender system 210 may further determine or provide probability distributions for a customer's behavior from his past actions.

In an embodiment, the SLA regulation system 108 may include an intelligent agent (not shown) in game theoretic settings that may choose actions that are not most profitable to the customer 110 in the current period, but the intelligent agent can mislead the recommender system 210 in such a way that in the future, the recommender system 210 may have a low price offering for this customer 110. Another assumption is that the customers 110A-N may value future profits much less as compared to current profits. A single customer (e.g., 110B) may not be able to manipulate prices, and even if the customer 110B is able to accomplish this, he/she may find it difficult to perform the manipulation to achieve a useful result.

Another assumption is that price may be lower if performance requirement is lower. This reduction in price is captured by function D(p,l). Here D(p,l) refers to discounted price at performance level 'l' given price 'p'. Similarly, there may be a discount for high green points or less performance, i.e. less computing resources. For example, in the disclosed SLA regulation system 108, lower performance mostly leads to higher Green Point, or conversely, if the customer 110 desires to pursue greener deployment, then the performance level may be reduced. This may in turn lead to discounts to the customers 110A-N. Here, D(p,l) can refer to the discounted price that the customer 110 may have to pay if the customer 110 chooses to operate at performance level l, whereas p is the price at performance level K. Further, in some embodiments, other methods or functions may be used to determine the discount. In an embodiment, a simple and general approximation of the discount function can be a linear relationship with the performance level and may be denoted as "D(p,l)=(l/K)*p".

The recommender system 210 may keep track of behavior of customers 110A-N in each round or negotiation iteration. The recommender system 210 can continue learning probabilities about behavior of each of the customers 110A-N. That is, what is the probability of a customer (of the customers 110A-N) selecting a given performance level at the given price offering. Further, depending on the discounting model, the disclosed mechanism determines the price offering for enhanced, improved or even a maximum performance level as the upper-limit of the price range offered. The discounting model (e.g. "D(p,l)=(l/K)*p") can then be used to compute the price of a lower or the lowest performance level as the lower limit of the range.

Exemplary Method for Calculating Differentiated Price Offering for Multiple Customers The exemplary goal or advantage of the SLA regulation system 108 is to maximize profit for the service provider. There is a difference between revenue and the cost. The pricing of a single object is performed as "Max pd(p)−C(d(p))", here D(p) is demand at price 'p'. For explaining the method, a static pricing scheme is used, but a person skilled in the art will appreciate that the pricing scheme can be dynamic. Therefore, according to the static pricing scheme, the customers 110A-N may be offered or may view the same price in the SLA. The customers 110A-N are classified into multiple classes. Further, the price is kept dynamic for calculation purposes only. The resources required for deploying services can be computing servers in the cloud 100. The resources may not be sold forever, but rather rented out for specified duration to various customers 110A-N. Therefore, based on dynamic demand, the resources in the cloud 100 may be priced. Also, the differentiated pricing module 208 may implement the pricing based game such that a discount may be provided to customers requesting less resources (e.g. going more green). Thus, for the SLA regulation system 108, d(p) at level l may refer to expected number of customer (of the customers 110A-N) that accept the (l,p) configuration.

The d(p) may be calculated based on probability distribution Pric (i.e. using prior distribution) and the performance requirement set by the customer 110 at period 't'. Therefore, q refers to an expected number of resources required given a current required configuration.

The disclosed method may use either of two of the following approaches. In a first approach, the differentiated pricing module 208 may determine the resource price based on current demand of the resource (without considering the uncertainty in change of demand based on user's likelihood of actually renting the resources). In a second approach, the differentiated pricing module 208 may determine the resource price based on expected demand (using prior distribution without considering the current demand). Further, the differentiated pricing module 208 is configured to determine price offerings based on past distribution on demand after observing the customers' current demand and the prior distribution. The differentiated pricing module 208 may use prior distribution on demands and current demand in pricing, to determine and calculate price offerings and suggest some configurations to the customers 110A-N. In an exemplary scenario, some customers (of the customers 110A-N) may drop off as they may not like the suggested configuration or may be for other reasons. In such a situation, the resources in the cloud 100 may be underutilized. In another exemplary scenario, some customers (of the customers 110A-N) may increase their requirement on performance levels and the resources in the cloud 100 may get overloaded. To minimize or avoid such extreme cases, the disclosed system and method for providing cloud services may use a customer behavior model, which can be used to calculate the probability of a customer 110 or customers 110A-N accepting a certain configuration from a history and current demand of the customers 110A-N. The system or method may calculate value of q by using such behavior based models and distributions as follows:

$$q = \sum_{\{i=1\}}^{\{i=ng\}} \sum_{\{l=1\}}^{\{l=k\}} l * Pr_i^g \Big( D(p_g, l), $$
$$l|\text{current demand}\Big) + \sum_{\{i=1\}}^{\{i=ns\}} \sum_{\{l=1\}}^{\{l=k\}} l * Pr_i^s(D(p_s, l)|\text{current demand}\Big) + $$
$$\sum_{\{i=1\}}^{\{i=nb\}} \sum_{\{l=1\}}^{\{l=k\}} l * Pr_i^b(D(p_b, l)|\text{current demand})$$

Exemplary Calculation of Expected Demand (First Approach)

One exemplary method of calculating differentiated price offering may be demonstrated by following example. In one example, there are only gold customers and a price of $10 is set for full performance, where full performance K=3. (Low, medium and High). Further, a linear discount function i.e. "D(p,l)=(l/k)*p" may be used in this embodiment. Thus, D(10,1)=$3.33, D(10,2)=$5 and D(10,3)=$10. In this example, there are two customers 110A-B who have set their demands to be High and Medium, respectively. Under that demand the service deployment probabilities for the customers 110A-B may be assumed to be as follows (these values can be determined based on past behavior pattern with an initial assumption of uniform distribution).

For customer 110A; Pr_1(3.33,1|high demand)=0.2 (that is accepting low performance at $3.33, if he/she has demanded initially for high performance);

Pr_1(5,2|high demand)=0.4; Pr_1(10,3|high demand)=0.15; 25% of the time the customer 110A may reject the configurations and leave the system.

For customer 110B: Pr_2(3.33,1|medium demand)=0.1 (that is accepting low performance at $3.33, if he has demanded initially medium performance); Pr_2(5,2|mediumdemand)=0.6; Pr_2(10,3|mediumdemand)=0.2; 10% of the time customer 110B may reject the configurations and leave the system.

In some embodiments, various monitoring and statistics techniques may be used to determine prior distributions on customers 110A-N who can accept certain configurations and calculate the posterior after they are set. Based on the above information, the expected demand 'q' can be calculated as $$q=1*0.2+2*0.4+3*0.15+1*0.1+2*0.6+3*0.2=3.35$$

Exemplary Equations and Calculations for Maximizing Revenue of the Service Provider $$\text{Maximize} \sum_{\{l=0\}}^{\{l=K\}} \left( \sum_{\{i=1\}}^{\{i=ng\}} D(p_g, l) Pr_i^g(D(p_g, l), l \mid \text{current demand}) \right) +$$
$$\left( \sum_{\{i=1\}}^{\{i=ns\}} D(p_s, l)(Pr_i^s(D(p_s, l), l \mid \text{current demand}) \right) +$$
$$\sum_{\{i=1\}}^{\{i=nb\}} (D(p_b, l)(Pr_i^b(D(p_b, l), l \mid \text{current demand})) - C(q)(l)$$

At time 't,' the customers 110A-N may log into the disclosed SLA regulation system, as explained with regard to FIG. 1, and select their preferred performance level (or green point level). The SLA regulation system 108 can solve the above pricing problem, as well as recommend each of the customers 110A-N some configurations that is tuple, (Green Point Levels, Performance Level and Price). The pricing scheme may be fixed for a certain duration initially. The customer 110 may accept the configuration or may modify performance level or green point level (or other high-level parameters). Accordingly, the SLA regulation system 108 may modify the SLA or price, and display to the customer 110. The customer 110 may continue playing, and finally within some period he/she may either accept some configuration or reject and quit. After all 'n' iterations, based on whether the customers' requests are accepted or rejected, the price offerings may change in the next iteration.

Exemplary Cost Estimations

The disclosed method or system implements a proper cost estimation to have a good solution on the offered price to customers 110A-N. In an embodiment, a conservative approach toward cost estimation of expected demand may be to use worst-case cost from the available resources. However, this approach may lead to high cost estimations, and hence high price offering and potentially reducing the probability of deployment (depending on distribution). Another extreme approach can be to use best case cost estimations from available resources. However, this would lead to lower prices for services and potential loss of revenue. An average cost estimate from the available resources can be used. However, a more sophisticated cost estimation can be performed through proper experimentation and reach a point where the price does not become too high or too low.

A method for optimizing the estimation of discounts and cost is explained using the following example. In this example, Yg constitutes a discount for Gold customers over Silver and Ys for Silver customers over Bronze (i.e., pg=Yg and ps=Ys). By choosing pb, all of the other prices can be derived. It may be assumed that pb is always between some pbl and pbu. The upper limit, pbu, can be some number higher than the cost of all available resources. The lower limit, pbl, can be the cost of a single cheapest resource available. Initially pbl may be used and gradually increased until pbu and 'q' (expected demand given current demand) and profit may be determined. In this example, pb=the price that maximizes (or enhanced/improves) the above term. The algorithm to set prices (assuming $\Delta$ to be the step size) is explained in the following section. Further, the algorithm takes a value of pbl, pbu, $\Delta$, prci, D(p,l), Yg, Ys as input and outputs value of pb, ps, pg. Steps of the algorithm may include:

Step 1. $p'_b = p_{bi}$
Step 2. max=0
Step 3. $p'_s = y^s * p'_b$ and $p'_g = y^g * p'_s$
Step 4. Find q at price $p'_b$, $p'_s$, $p'_g$
Step 5. Calculate current profit as given by expression 1
Step 6. If current profit>max, then $p_b = p'_b$ and max=current profit
Step 7. $p'_b = p'_b + \Delta$
Step 8. If $p'_b <= p_{bh}$ GOTO Step 3
Step 9. Out: $p_b$, $p_s = y^s p_b$, $p_g = y^g p_s$ Even though the above disclosure assumes that Gold customers get maximize (or enhanced/improved) discounts and Silver customers also get discounts, the disclosed methodology can also be used wherein the price for Gold customers is highest and highest priority may be given to them while suggesting configurations. The prices pb, ps, and pg are the upper limit of the price range offered (corresponding to the enhanced, improved or maximum performance level). The discounting function D(p,l) can be applied to these values to compute the lower limit of the price range (that correspond to the lowest performance level).

It will be understood that the modules and the databases referred to in the previous sections are not necessarily utilized together in a single form processing system. Rather, these modules are merely exemplary of the various modules that may be implemented within a cloud configuration system. Further, it will be understood that the cloud configuration system may include more modules than the ones described in this disclosure without departing from the scope of the present disclosure.

It will be appreciated that several of the above-disclosed and other features and functions, or alternatives thereof, may be desirably combined into many other different systems or applications. Various presently unforeseen or unanticipated alternatives, modifications, variations, or improvements therein may subsequently be made by those skilled in the art, which are also intended to be encompassed by the following claims.

What is claimed is:

1. A method for increasing an energy efficiency of a computing cloud through a service level agreement (SLA) regulation system, the method comprising:
   receiving, using at least one service input interface, a plurality of requests for the one or more cloud services from a plurality of customers simultaneously or substantially simultaneously, wherein the plurality of customers are categorized into one or more classes;
   prioritizing, using a request processor, the plurality of requests based on a probability distribution of deploying a requested service and an expected demand of the requested service;

generating, using a cloud configuration generator, a plurality of cloud configurations and service bundles for each of the plurality of customers based on the prioritization of the plurality of requests and at least one of the classes of the plurality of customers, past behavior of each of the plurality of customers, and a current demand of the one or more cloud services in the computing cloud, wherein the cloud configurations are generated based on a probability that resources comprising the generated cloud configurations are deployed to at least one of the plurality of customers;

recommending, using a recommendation system, at least one of the generated plurality of cloud configurations and the associated service bundles to each of the plurality of customers, wherein the service bundles for the plurality of customers further comprise an energy efficiency for cloud configurations generated for the customers; and providing, using at least one output interface, the one or more cloud services to the plurality of customers based on the prioritizing of the plurality of requests, the service bundles, and the cloud configurations.

2. The method of claim 1, further comprising adjusting one or more of the cloud configurations and the service bundles for at least a portion of the customers based on received feedback from the customers; and providing, using the at least one output interface, the one or more cloud services to the plurality of customers based on the prioritizing of the plurality of requests and one or more of the adjusted service bundles and the adjusted cloud configurations.

3. The method of claim 1, further comprising:

adjusting an energy efficiency for a service bundle for one of the plurality of customers based on received feedback from the one customer; and providing, using the at least one output interface, the one or more cloud services to the plurality of customers based on the prioritizing of the plurality of requests, the adjusted service bundles, and the adjusted cloud configurations.

4. The method of claim 2, wherein receiving the plurality of requests further comprises receiving, using the at least one service input interface including one or more input fields, one or more high-level parameters for the one or more cloud services, wherein the one or more high-level parameters include at least one of a performance level for the requested cloud service, a Green Point for the requested cloud service, a budget of at least one customer among the plurality of customers, and a location of the at least one customer among the plurality of customers.

5. The method of claim 4, further comprising:

receiving feedback from one or more of the plurality of customers based on the recommended cloud configurations and service bundles;

repeating, based on the received feedback, the generating and recommending until each of the plurality of customers select at least one the plurality of generated cloud configurations based on the associated service bundles, wherein terms of the associated service bundles are negotiated based on a predefined trade-off between the one or more high-level parameters through a SLA negotiator.

6. The method of claim 1, wherein the cloud configurations and service bundles for the customers are generated based on available resources at the computing cloud.

7. The method of claim 6, wherein the available resources at the computing cloud are reduced based on an expected demand for resources from previously received requests for cloud services.

8. The method of claim 1, further comprising determining, using a differentiated pricing module, for each of the plurality of requests, the deployment probability of the one or more cloud services corresponding to at least one differentiated price offering.

9. The method of claim 8, wherein the plurality of requests is prioritized in a queue based on a descending order of the deployment probability of each of the requested one or more cloud services and the corresponding at least one differentiated price offering.

10. The method of claim 1, further comprising searching, using the cloud configuration generator, for an enhanced cloud configuration for each of the plurality of requests based on at least one of the prioritization of the plurality of requests, the class of each of the plurality of customers, the past behavior of each of the plurality of customers, and the current demand of the one or more cloud services in the computing cloud.

11. The method of claim 1, wherein the step of recommending further comprises assigning a priority to the one or more cloud services based on their deployment probability by the plurality of customers, such that a cloud service among the one or more cloud services assigned with highest priority is given a higher preference to secure available resources.

12. A service level agreement (SLA) regulation system for efficiently providing one or more cloud services to a plurality of customers in a computing cloud, the system comprising:

at least one service input interface configured to receive a plurality of requests for the one or more cloud services from a plurality of customers simultaneously or substantially simultaneously, wherein the plurality of customers are categorized into one or more classes;

a request processor configured to prioritize the plurality of requests based on a probability distribution of deploying a requested service and an expected demand of the requested service;

a cloud configuration generator configured to generate a plurality of cloud configurations and service bundles for each of the plurality of customers based on the prioritization of the plurality of requests and at least one of the classes of the plurality of customers, past behavior of each of the plurality of customers, and a current demand of the one or more cloud services in the computing cloud, wherein the cloud configurations are generated based on a probability that resources comprising the generated cloud configurations are deployed to at least one of the plurality of customers;

a recommender system configured to recommend at least one of the generated plurality of cloud configurations and the associated service bundles to each of the plurality of customers, wherein the service bundles for the plurality of customers further comprise an energy efficiency for cloud configurations generated for the customers;

at least one output interface configured to provide the one or more cloud services to the plurality of customers based on the prioritizing of the plurality of requests, the service bundles, and the cloud configurations.

13. The system of claim 12, wherein the system is further configured to:

adjust one or more of the cloud configurations and the service bundles for at least a portion of the customers based on received feedback from the customers; and provide, using the at least one output interface, the one or more cloud services to the plurality of customers based on the prioritizing of the plurality of requests and one or more of the adjusted service bundles and the adjusted cloud configurations.

14. The system of claim 12, wherein the system is further configured to:

adjust an energy efficiency for a service bundle for one of the plurality of customers based on received feedback from the one customer; and provide, using the at least one output interface, the one or more cloud services to the plurality of customers based on the prioritizing of the plurality of requests, the adjusted service bundles, and the adjusted cloud configurations.

15. The system of claim 13, wherein receiving the plurality of requests further comprises receiving, using the at least one service input interface including one or more input fields, one or more high-level parameters for the one or more cloud services, wherein the one or more high-level parameters include at least one of a performance level for the requested cloud service, a Green Point for the requested cloud service, a budget of at least one customer among the plurality of customers, and a location of the at least one customer among the plurality of customers.

16. The system of claim 15, further comprising a SLA negotiator, wherein the system is further configured to:

receive feedback from one or more of the plurality of customers based on the recommended cloud configurations and service bundles;

repeat, based on the received feedback, the generating and recommending until each of the plurality of customers select at least one the plurality of generated cloud configurations based on the associated service bundles, wherein terms of the associated service bundles are negotiated based on a predefined trade-off between the one or more high-level parameters through the SLA negotiator.

17. The system of claim 12, wherein the cloud configurations and service bundles for the customers are generated based on available resources at the computing cloud.

18. The system of claim 17, wherein the available resources at the computing cloud are reduced based on an expected demand for resources from previously received requests for cloud services.

19. The system of claim 12, further comprising a differentiated pricing module configured to determine, for each of the plurality of requests, the deployment probability of the one or more cloud services corresponding to at least one differentiated price offering.

20. The method of claim 19, wherein the plurality of requests is prioritized in a queue based on a descending order of the deployment probability of each of the requested one or more cloud services and the corresponding at least one differentiated price offering.

* * * * *